United States Patent
Johnston

(10) Patent No.: US 10,364,570 B2
(45) Date of Patent: Jul. 30, 2019

(54) BUILDING FORMS AND METHOD OF ASSEMBLING SAME

(71) Applicant: EZ PVC LLC, Las Vegas, NV (US)

(72) Inventor: Bruce Johnston, Las Vegas, NV (US)

(73) Assignee: EZ PVC LLC, Las Vegas, NV (US)

( * ) Notice: Subject to any disclaimer, the term of this patent is extended or adjusted under 35 U.S.C. 154(b) by 0 days.

(21) Appl. No.: 15/989,421

(22) Filed: May 25, 2018

(65) Prior Publication Data

US 2018/0340332 A1  Nov. 29, 2018

Related U.S. Application Data

(60) Provisional application No. 62/510,950, filed on May 25, 2017.

(51) Int. Cl.
  *E04B 2/86*  (2006.01)
  *F16B 5/00*  (2006.01)
  (Continued)

(52) U.S. Cl.
  CPC ............ *E04B 2/8629* (2013.01); *E04G 11/06* (2013.01); *E04G 17/001* (2013.01); *E04G 17/02* (2013.01);
  (Continued)

(58) Field of Classification Search
  CPC .......... E04B 2/8629; E04B 2002/8676; E04B 2002/867; E04B 2103/02; E04G 17/001; E04G 17/02; E04G 11/06; E04G 17/0754
  See application file for complete search history.

(56) References Cited

U.S. PATENT DOCUMENTS 4,104,837 A  *  8/1978  Naito ................... B62D 27/06
                                                52/239
4,557,091 A  12/1985  Auer
                     (Continued)

FOREIGN PATENT DOCUMENTS

CA    2329358 A1    6/2002
WO    03031740 A1   4/2003
                  (Continued)

OTHER PUBLICATIONS

International Search Report; PCT/US2018/034575; dated Aug. 7, 2018; 5 pages.

*Primary Examiner* — Rodney Mintz
(74) *Attorney, Agent, or Firm* — Dickinson Wright PLLC

(57) ABSTRACT

A building form system including a plurality of forms for assembling into a wall template that is filled with concrete to create a building wall. The system includes a corner form assembly comprising an inner corner form and an outer corner form for disposition on a corner footing. The outer corner form includes walls angled from a bend. A pair of connectors are disposed on opposite ends from the bend. The inner corner form includes corresponding connectors for attachment to the outer corner form around a preset vertical rebar in the corner footing. The system further includes a base form extending between a first pair of connectors that include a peripheral wall disposed directly therebetween and the second pair of connectors for mating engagement with the first that include an inset wall spaced inwardly therefrom. Spacing between the peripheral and inset wall of adjacent base forms accommodating vertical rebar.

19 Claims, 17 Drawing Sheets

(51) Int. Cl.
*E04G 11/06* (2006.01)
*E04G 17/00* (2006.01)
*E04G 17/02* (2006.01)
*E04G 17/075* (2006.01)

(52) U.S. Cl.
CPC . *E04B 2002/867* (2013.01); *E04B 2002/8676* (2013.01); *E04B 2103/02* (2013.01); *E04G 17/0754* (2013.01); *F16B 5/0016* (2013.01)

(56) References Cited

U.S. PATENT DOCUMENTS

| | | | |
|---|---|---|---|
| 5,216,863 A | 6/1993 | Nessa et al. | |
| 5,740,648 A * | 4/1998 | Piccone | E04B 2/86 249/191 |
| 6,247,280 B1 * | 6/2001 | Grinshpun | E04B 2/8635 52/309.12 |
| 7,628,570 B2 | 12/2009 | Davidsaver et al. | |
| 9,091,061 B2 | 7/2015 | Dincel | |
| 9,982,444 B2 * | 5/2018 | Richardson | E04G 17/00 |
| 2003/0009967 A1 * | 1/2003 | Piccone | E04B 1/12 52/426 |
| 2005/0016103 A1 * | 1/2005 | Piccone | E04B 2/8641 52/481.1 |
| 2012/0056344 A1 * | 3/2012 | Richardson | E04B 1/6116 264/35 |
| 2012/0223212 A1 * | 9/2012 | Schneider | E04G 9/06 249/187.1 |
| 2013/0192155 A1 | 8/2013 | Bergeron | |
| 2014/0318062 A1 * | 10/2014 | Richardson | E04B 2/8635 52/309.1 |
| 2016/0289960 A1 * | 10/2016 | Darwell | E04B 1/6137 |
| 2017/0175407 A1 * | 6/2017 | Richardson | E04G 17/00 |

FOREIGN PATENT DOCUMENTS

| | | | | |
|---|---|---|---|---|
| WO | WO-2004040076 A1 * | 5/2004 | | E04B 1/12 |
| WO | 20150149187 A1 | 10/2015 | | |
| WO | WO-2018039731 A1 * | 3/2018 | | E04G 9/05 |

* cited by examiner

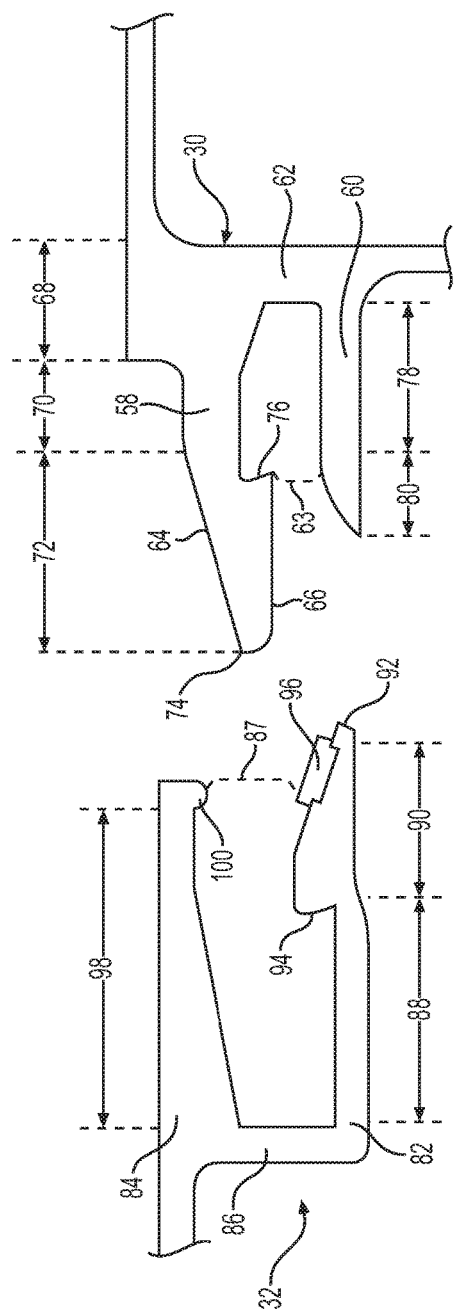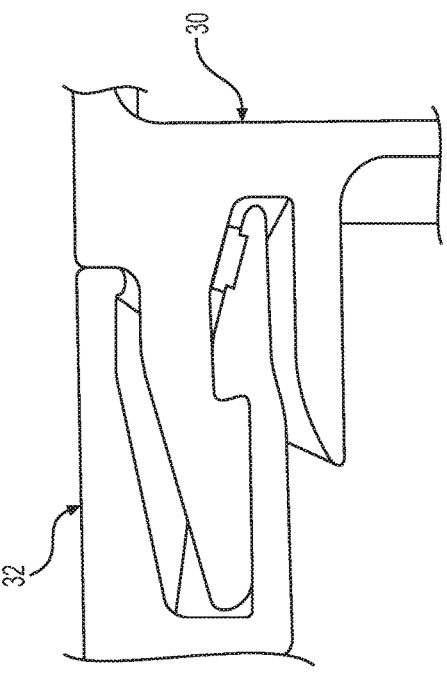
FIG. 9A
FIG. 9B

BUILDING FORMS AND METHOD OF ASSEMBLING SAME

CROSS-REFERENCE TO RELATED APPLICATION

This application claims the benefit of and priority to U.S. Provisional Patent Application Ser. No. 62/510,950 filed May 25, 2017. The disclosure of the above application is incorporated by reference herein as if fully set forth in its entirety.

BACKGROUND OF THE INVENTION

1. Field of the Invention

A plurality of forms for assembling onto footings and filling with concrete or the like to create walls of a building.

2. Description of the Prior Art

This section provides background information related to the present disclosure which is not necessarily prior art.

Form templates have been used in the building industry over the years and have assisted builders in efficiently constructing concrete walls without the intricate masonry that is typically required with block laying. These form templates, or "forms", are typically manufactured of wood, metal, and more modernly various types of plastics. During construction of a building, these forms are placed on the top of footings and define cavities that expand substantially the length and height of a planned foundation wall, whereafter they are filled with poured concrete that is allowed to harden into the finished foundation wall. It should be appreciated, however, that while forms are generally used for foundation walls, they have also be used to construct concrete walls on any level of a building. Concrete walls constructed with forms exhibit smooth surfaces and complex geometries that prove difficult with blocks. While both the construction and the wall itself can be advantageous to traditional block walls, working with forms have certain drawbacks. At the outset, because these forms are often large and cumbersome, installation is difficult and dangerous to both the forms and the builders. If not installed perfectly, the finished walls can be misaligned or bowed, requiring a complete teardown of that section. Moreover, because the forms are so large, they are subject to an extreme amount of internal forces, namely the weight of the poured concrete pushing outwardly and thus must be able to sustain the weight without bulging and warping.

Building code regulations add yet another layer of difficulty when it comes to preparing concrete walls with the forms. For example, building codes regularly require placement of reinforcing bar (rebar) in serial vertical and horizontal installments. Consequently, constructions that use forms are regularly subjected to specific problems when assembled under building code regulations. One problem is that the forms sometimes include reinforcing internal webbings that are obstructed by the preinstalled rebar. Warping or cutting of the internal webbings to conform with rebar negatively effects the forms ability to withstand internal and external forces. Another problem is that connecting forms often requires lifting one entire form over rebar and sliding it vertically along a track defined by an adjacent form already placed on the footing, exposing builders to even more danger and also requiring having heavy and expensive machinery on site. In addition to the vertical and horizontal installments of rebar, many building codes require rebar to be placed and bent in various configurations in the corners of a footing or wall. Such bent pieces of rebar usually require cutting or warping a corner form in order to fit it around the bent rebar. The corners of buildings are of paramount importance to the structural integrity of the entire building. However, if the webs in forms that make up corners are cut to allow installation, then the finished corner becomes weak. Likewise, when forms are bent, the local area that is deformed is easier to bend again.

Accordingly, there is a continuing need to improve forms to optimize installation, safeguard workers, and protect finished walls from warping and developing weak points from bending.

SUMMARY OF THE INVENTION

The invention provides a building wall system that includes a plurality of forms for filling with concrete and constructing a building wall. One of the forms includes a corner form assembly for disposition on a corner footing and comprises an inner corner form and an outer corner form. The outer corner form includes outer corner walls angled together at a vertex and a pair of female connectors on opposite sides of the bend. The inner corner form includes at least one inner corner wall with connectors disposed on opposite sides thereof with at least one of the connectors being a male connector. The corner form assembly includes an assembled condition and an unassembled condition. In the unassembled condition, the inner corner form and the outer corner form can be moved independently around a preset rebar in the corner footing. In the assembled condition, one of the at least one male connectors of the inner corner form is attached to at least one of the female connectors of the outer corner form for assembly around the preset rebar

BRIEF DESCRIPTION OF THE DRAWINGS

Other advantages of the present invention will be readily appreciated, as the same becomes better understood by reference to the following detailed description when considered in connection with the accompanying drawings wherein:

FIG. 9A is a top view of the male connector and the female connector oriented to be pushed together;

FIG. 9B is a top view of the male connector and the female connector engaged with one another;

DESCRIPTION OF THE ENABLING EMBODIMENT

Example embodiments will now be described more fully with reference to the accompanying drawings. In general, the subject embodiments are directed to a building form system and method of assembling same. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a building form system 10 is described and shown herein. The building form system 10 (illustrated best in FIG. 1) includes a plurality of forms 20, 22, 24, 26, 28 for assembling into a building wall template for filling with concrete or the like to form a finished building wall. During assembly, these forms 20, 22, 24, 26, 28 can be joined together in various configurations to outline a desired building wall layout. The forms 20, 22, 24, 26, 28, include connectors 30, 32 that snap together with connectors 30, 32 on adjacent forms 20, 22, 24, 26, 28 to ensure structural integrity of the entire wall template during filling by preventing the forms 20, 22, 24, 26, 28 from separating throughout the construction of the building wall. The connectors 30, 32 include male connectors 30 and female connectors 32, which will be described in more detail below.

Figure 2:
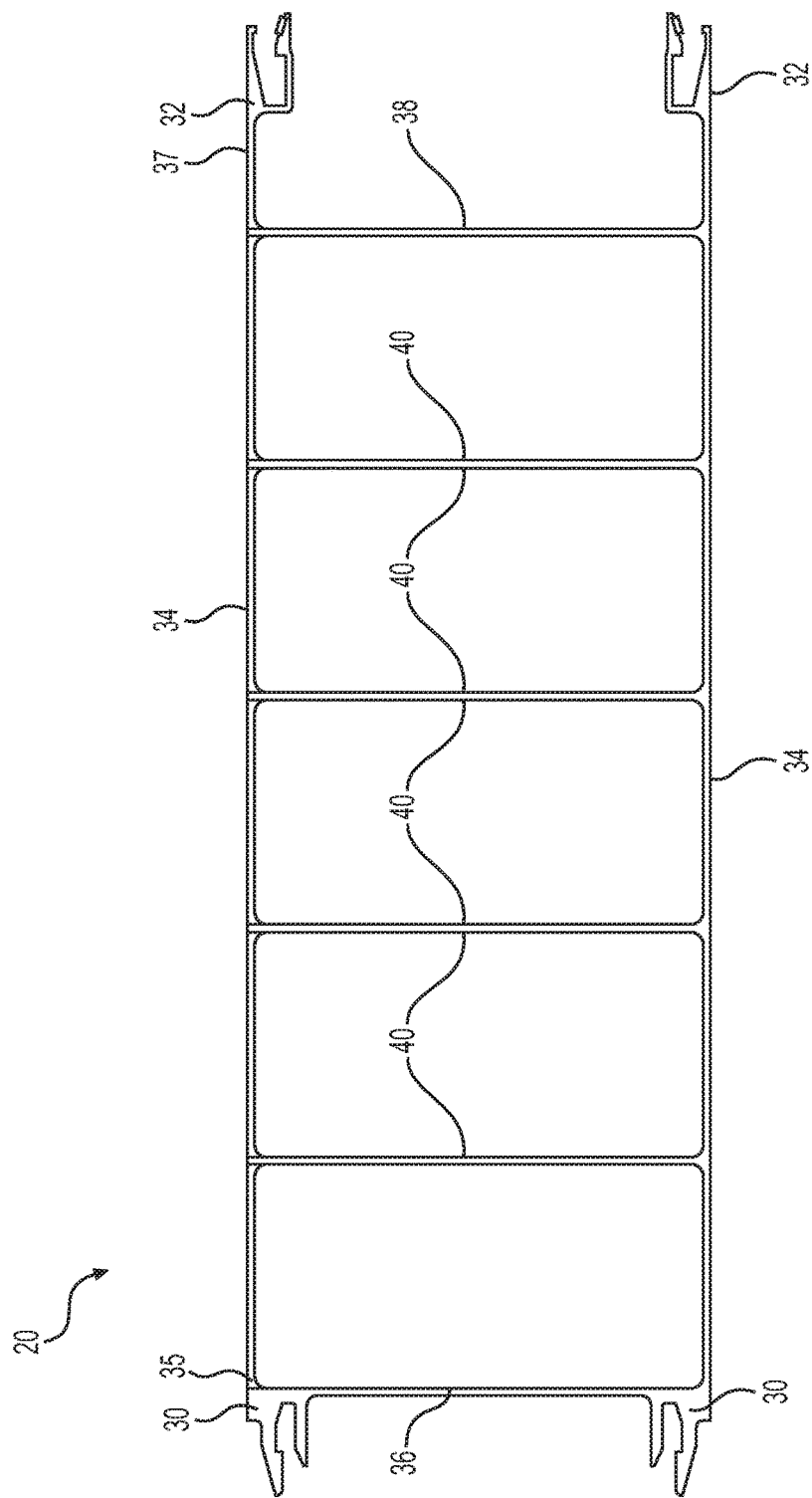
FIG. 2 is a top view of a base form having a pair of male and female connectors disposed at opposite ends.

The forms 20, 22, 24, 26, 28 include a base form 20, generally shown in FIG. 2, that is intended to ultimately form a majority of the wall template based on its extended length, which is typically about 18 inches. The base form 20 comprises a pair of base lateral walls 34 that extend between a first end 35 having a male connector 30 and a second end 37 having a female connector 32. The base lateral walls 34 outline what will be an exterior surface of a building wall. Each of the base lateral walls 34 are spaced apart in a parallel relationship by a peripheral wall 36 and an inset wall 38. The peripheral wall 36 extends between the first end 35 of each base lateral wall 34 and the inset wall 38 is on the opposite side and spaced slightly inwardly from the second ends 37 of the base lateral walls 34. The placement of the peripheral wall 36 and inset wall 38 allows multiple base forms 20 to be connected, male connector 30 to female connector 32, without the peripheral wall 36 and the inset wall 38 coming into contact. This spacing between the peripheral wall 36 and inset wall 38 allows a certain amount of debris to enter therebetween during connection without affecting the connection or structural integrity of the inset wall 38 and peripheral wall 36 due to warping or misalignment. The length of the base form 20 is sized to allow a preset rebar 51 to fit between the peripheral wall 36 and inset wall 38 of connected base forms 20, without requiring the base form 20 to be lifted over the preset rebar 51. The base form 20 also includes a plurality of webs 40 disposed between the peripheral wall 36 and the inset wall 38 providing improved connection between the base lateral walls 34. The webs 40 strengthen the base form 20 from external compression during manufacturing, shipping, and construction and reinforce the lateral walls 34 to prevent bulging from the weight of poured concrete. The spacing between the peripheral wall 36 and inset wall 38 of adjacently attached base forms 20 is preferably the same as spacing between webs 40.

Figure 11:
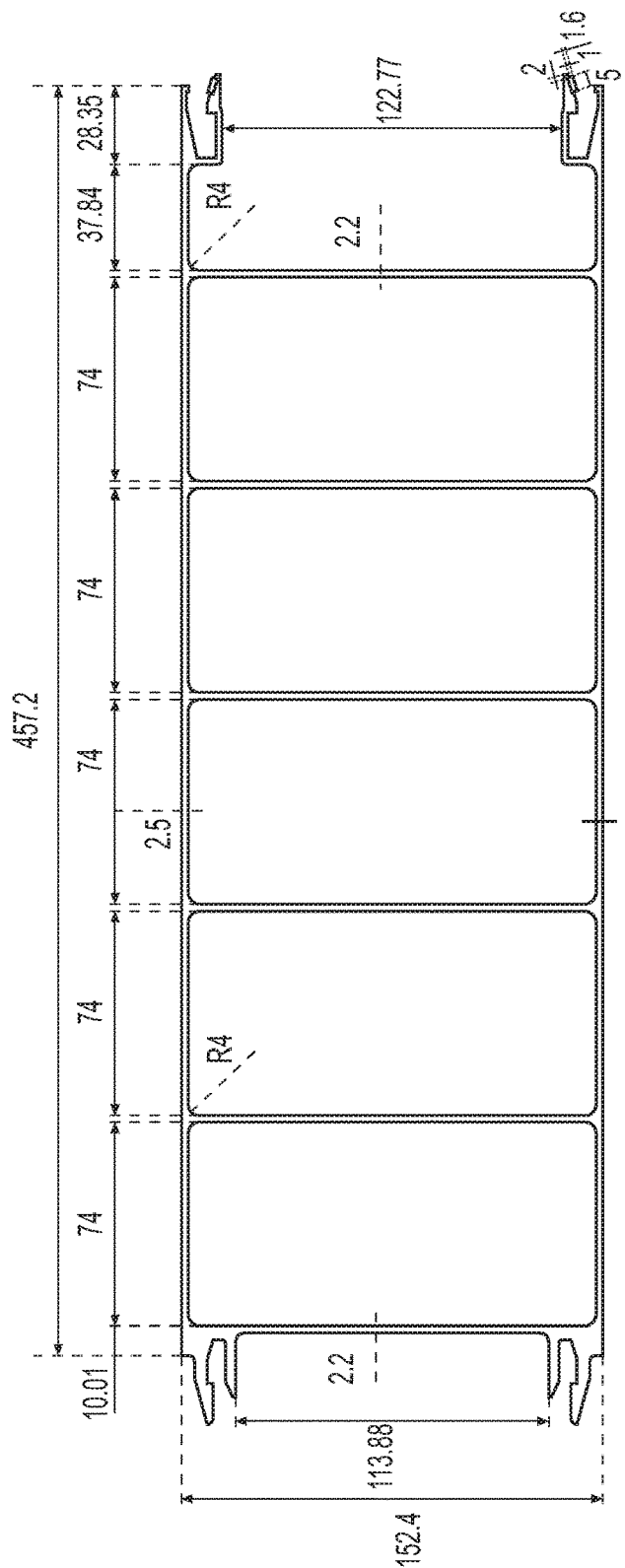
FIG. 11 illustrates one embodied dimension of the base form in accordance with an aspect of the invention.
Figure 12:
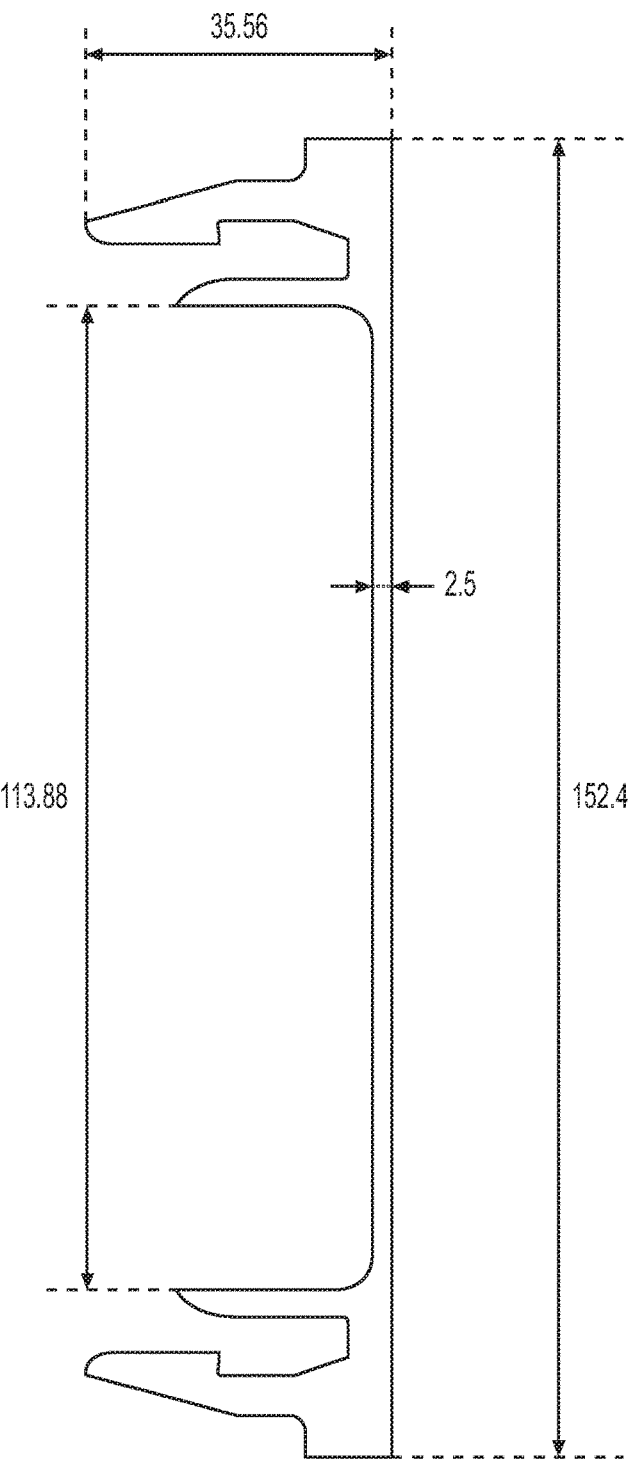
FIG. 12 illustrates one embodied dimension of the first cap form in accordance with an aspect of the invention.
Figure 13:
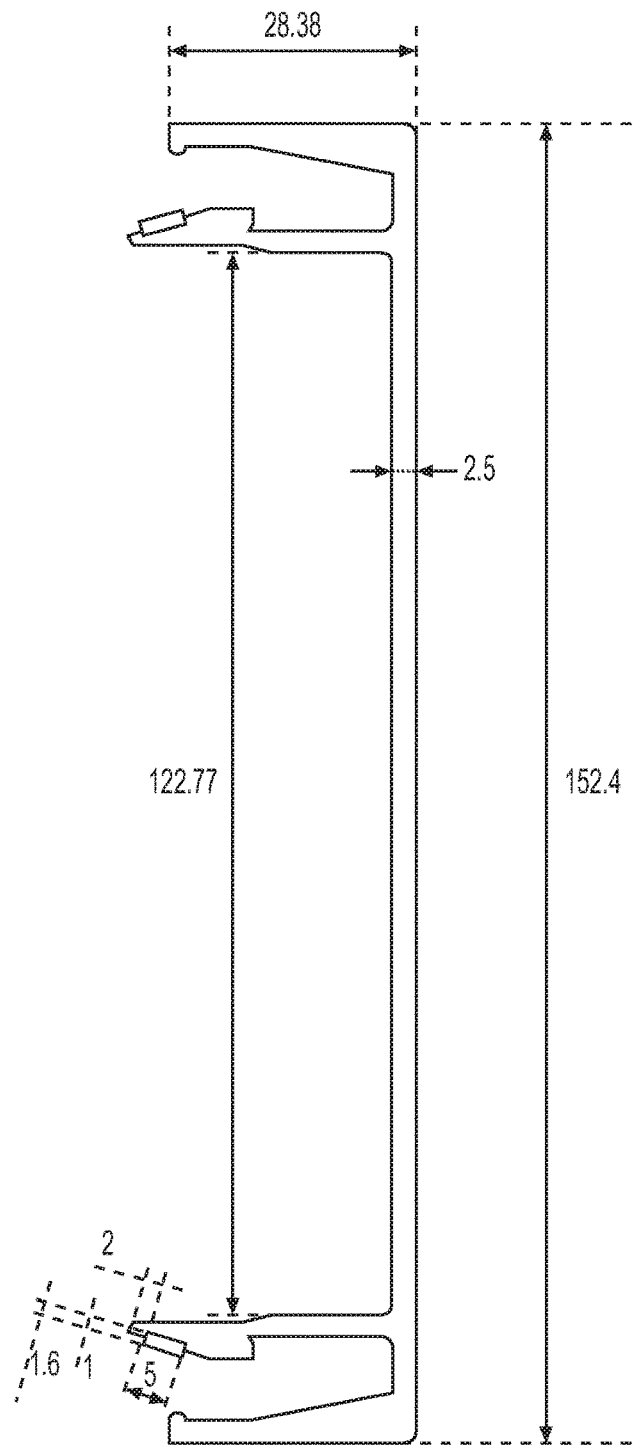
FIG. 13 illustrates one embodied dimension of the second cap form in accordance with an aspect of the invention.

When two or more base forms 20 are interconnected to one another, the male connectors 30 adjacent to the peripheral wall 36 on one base form 20 are aligned with the female connectors 32 spaced closest to the inset wall 38 of the other base form 20. The two base forms 20 are slid and pressed together until the connectors 30, 32 snap and lock. In accordance with the dimensioned embodiment illustrated in FIG. 11, when a series of base forms 20 are connected, there is a gap between the peripheral wall 36 and the inset wall 38 of adjoining base forms 20 every 18 inches. These are spacings are intended to enclose vertical rebar 51 that are preset every 18 inches as required by the United States Building Code. Therefore, the inset wall 38 of the base form 20 can be slid between preset vertical rebar 51 so that the vertical rebar becomes nested between an inset wall 38 and a peripheral wall 36 of adjoining base forms 20 without having to lift the entire base form 20 over the rebar.

Figure 1:
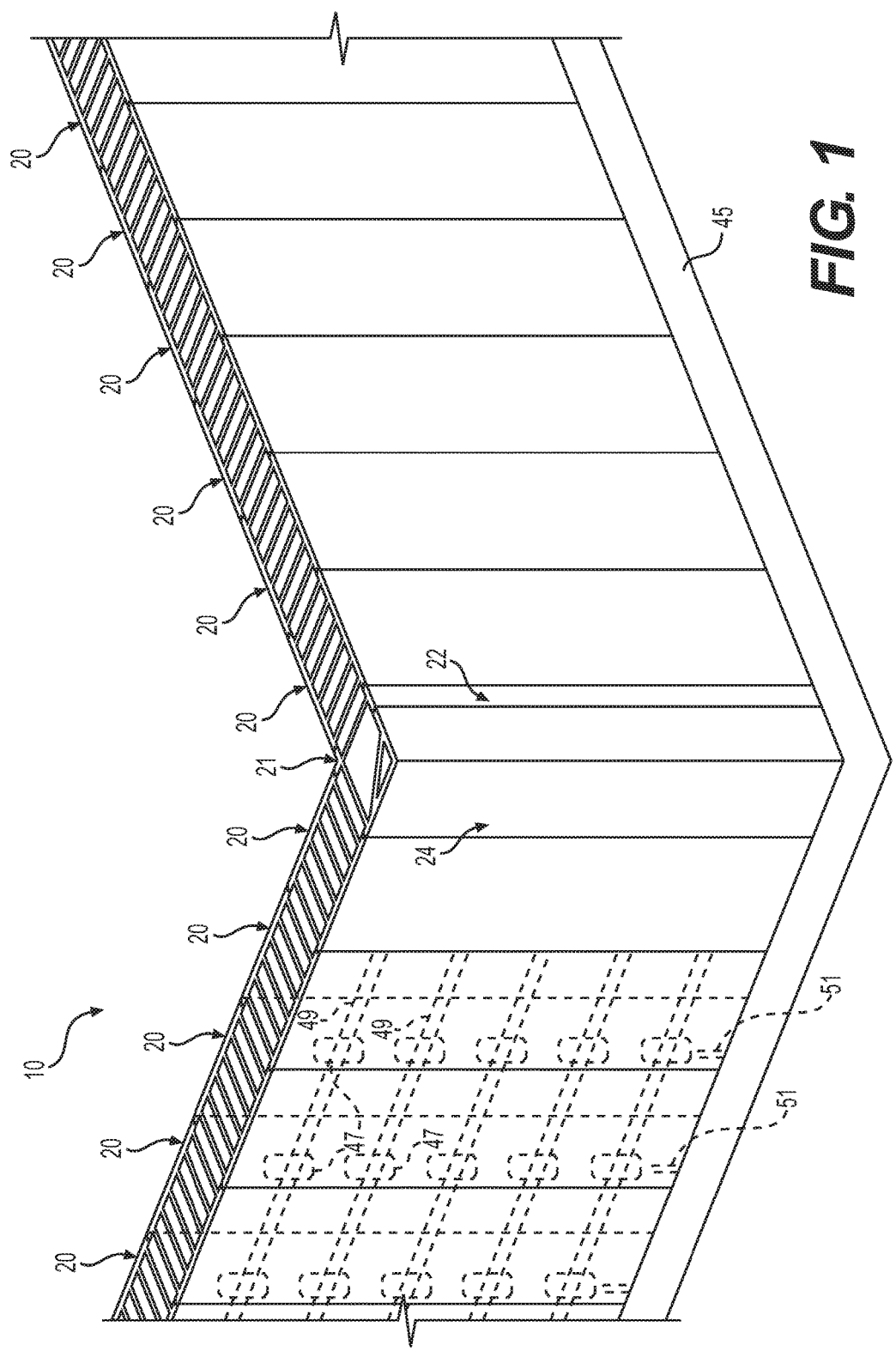
FIG. 1 is a perspective view of a building form system that incorporates a plurality of forms for creating a building wall template that is filled with concrete.
Figure 3:
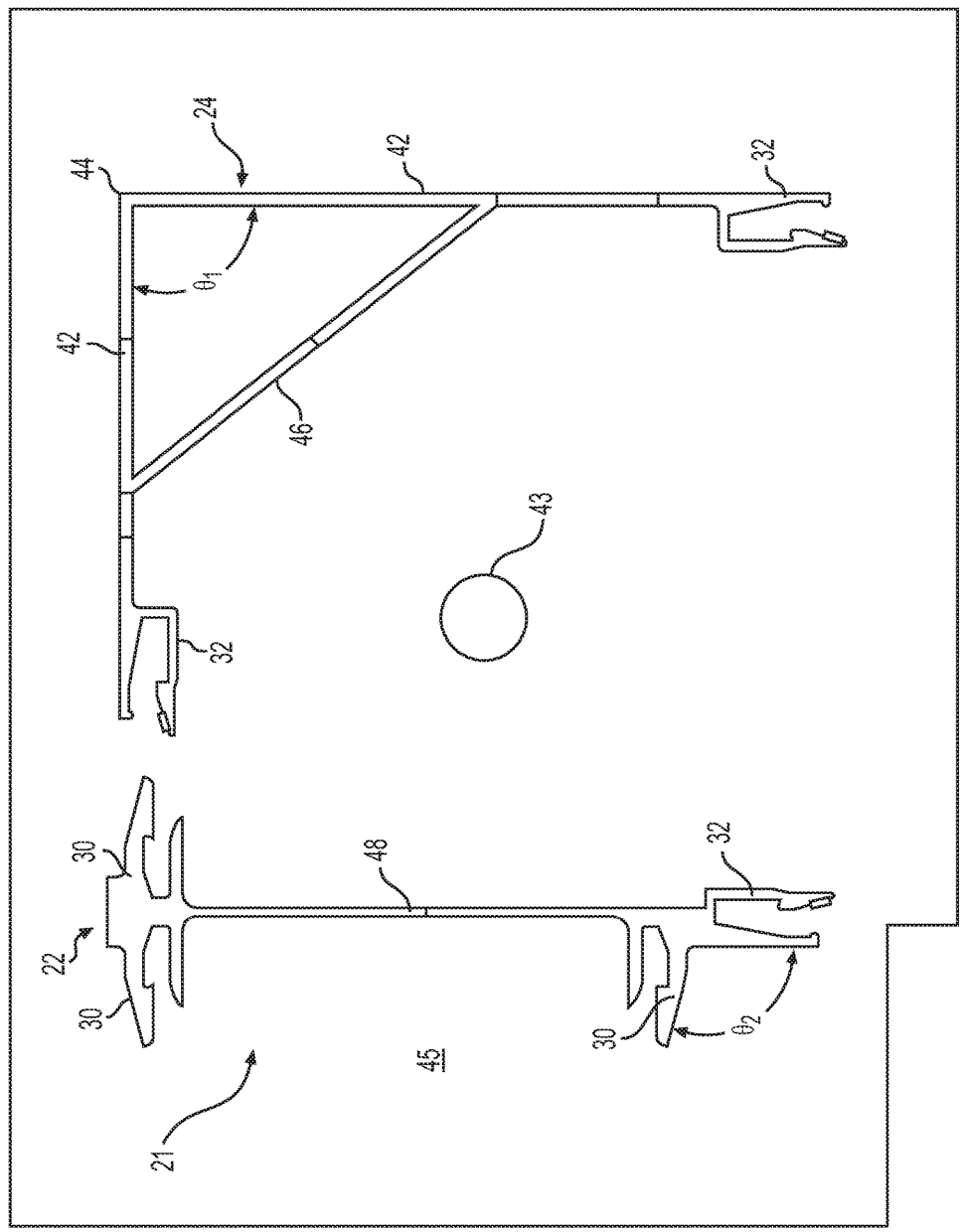
FIG. 3 is a top view of a corner form assembly including an outer corner form and an inner corner form oriented to be assembled together around a rebar preinstalled in a footing.

The forms 20, 22, 24, 26, 28 further include a corner form assembly 21 generally shown in FIG. 3 that is used to connect building walls that extend at a transverse angle with respect to one another. The corner form assembly 21 includes an inner corner form 22 and an outer corner form 24. The outer corner form 24 includes two outer corner walls 42 extending from female connectors 32 and adjoining at an angle to define a vertex 44 defining a first angle $\theta_1$. While a ninety-degree angle is shown in FIGS. 1 and 3, and will commonly be used for the corners of rectangular buildings or interior rooms, the first angle $\theta_1$ of the vertex 44 could be any angle needed to achieve the desired architectural layout, including compound angles, or walls with zig-zag patterns. A corner web 46 extends between the two outer corner walls 42 for maintaining the desired angle even when the corner form assembly 21 is subjected to internal and external forces. In a preferred embodiment, the corner web 46 is spaced from the female connectors 32 such that when a piece of vertical corner rebar 43 is preset in the center of a corner footing 45, the web is disposed between the rebar and the vertex 44 of the outer corner form 24 (e.g., on the outside of the corner rebar 43). The inner corner form 22 includes an inner corner wall 48 that extends from an adjacent pair of male connectors 30 facing in opposite directions to an adjacent pair of one male connector 30 and one female connector 32 disposed at an angular relationship defining a second angle $\theta_2$. Generally, the first angle $\theta_1$ will equal the second angle $\theta_2$. It should also be appreciated that the vertex 44 could be a rounded corner instead of a sharp corner.

During assembly, inner corner form 22 is adjoined to the outer corner form 24 in an assembled condition by mating one of the adjacent pair of male connectors 30 of the inner corner form 22 with one of the female connectors 32 on the outer corner wall 42. When the outer corner form 24 and the inner corner form 22 are being installed on a work site, the outer corner form 24 is secured outside the corner rebar 43 and the inner corner form 22 is fit into one of the female connectors 32 of the outer corner form 24 opposite the corner rebar 43. When the inner and outer corner forms 22, 24 are in an unassembled or separate condition, it allows the inner corner form assembly 21 to be easily fit onto the corner footing 45 and formed around the corner rebar 43, without cutting or bending. Therefore, when the corner form assembly 21 is assembled, there is a pair of male connectors 30 that will mate to the female connectors 32 of the base form 20 nearest the inset wall 38 to form a gap between adjacent walls 38, 48. Similarly, the pair of female connectors 32 of the corner form assembly 21 will attach to the male connectors 30 of the base form 20 such that the peripheral wall 36 provides support therebetween. Stated another way, either way the base form 20 is connected to the corner form assembly 21, one wall is disposed between the connected male and female connectors 30, 32.

Figure 4:
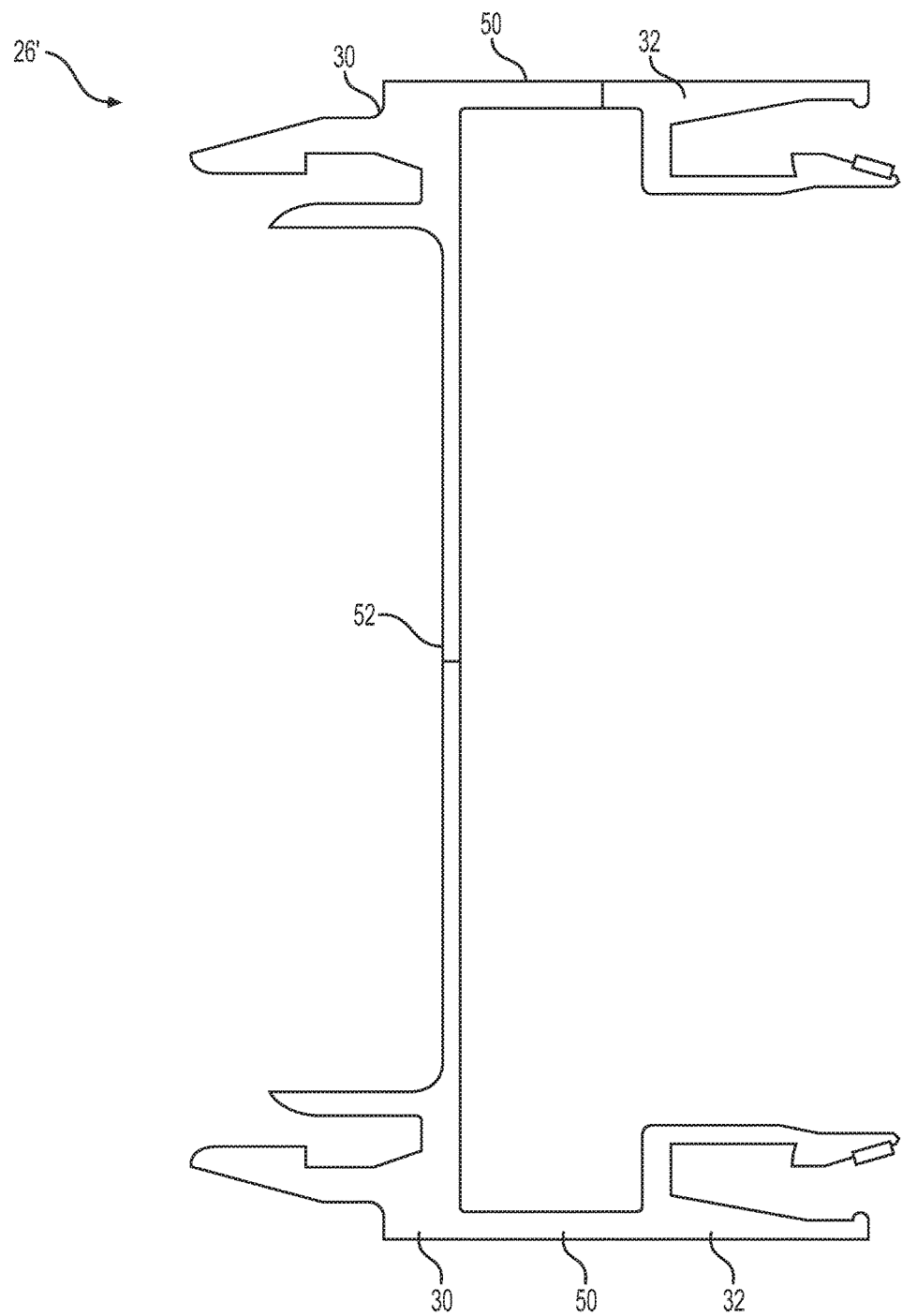
FIG. 4 is a top view of a first extension form shorter than the base form in FIG. 2.
Figure 15:
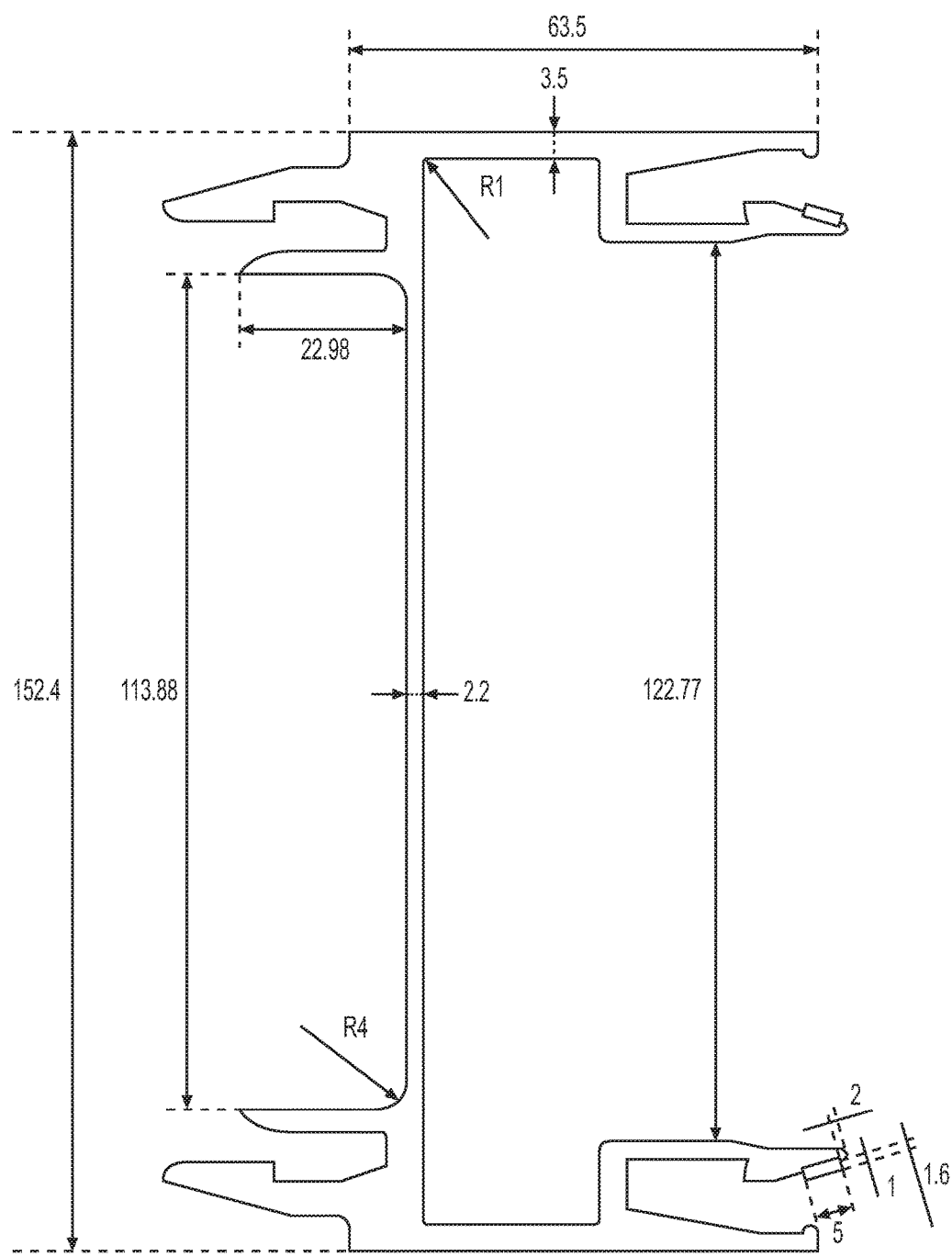
FIG. 15 illustrates one embodied dimension of the second extension form in accordance with an aspect of the invention.
Figure 16:
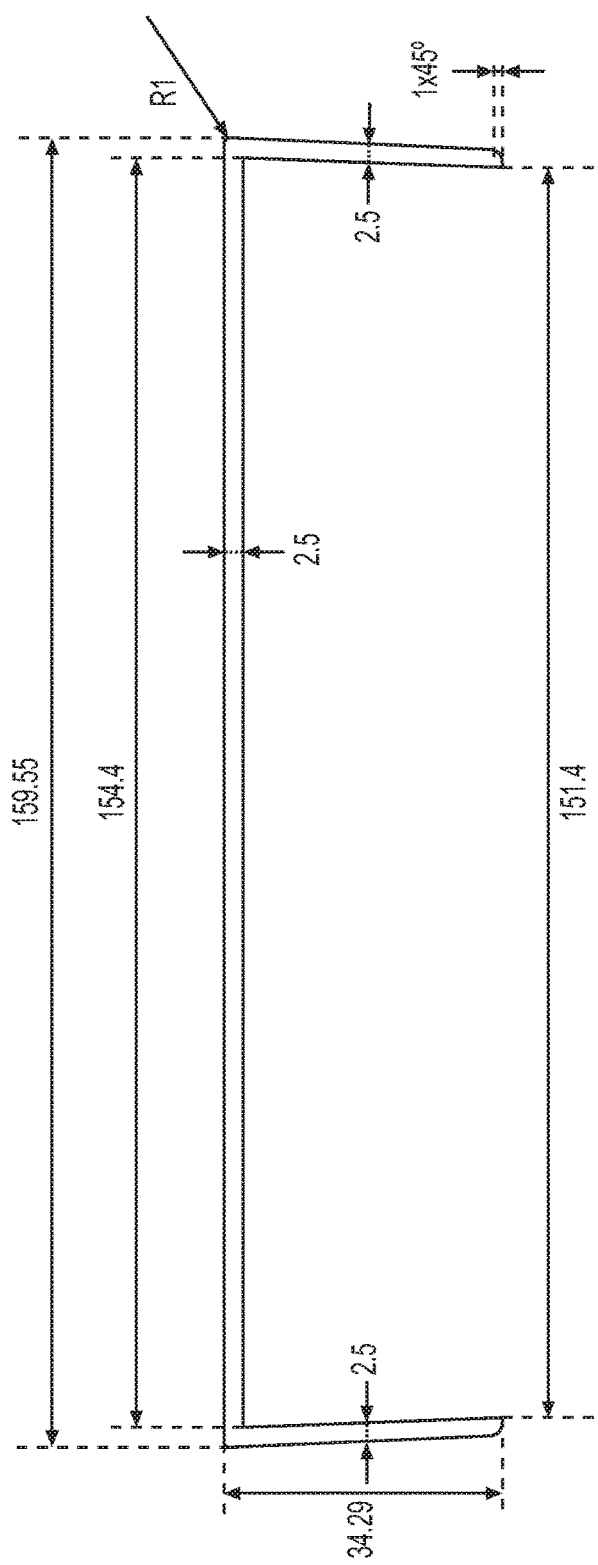
FIG. 16 illustrates one embodied dimension of the third cap form in accordance with an aspect of the invention.
Figure 17:
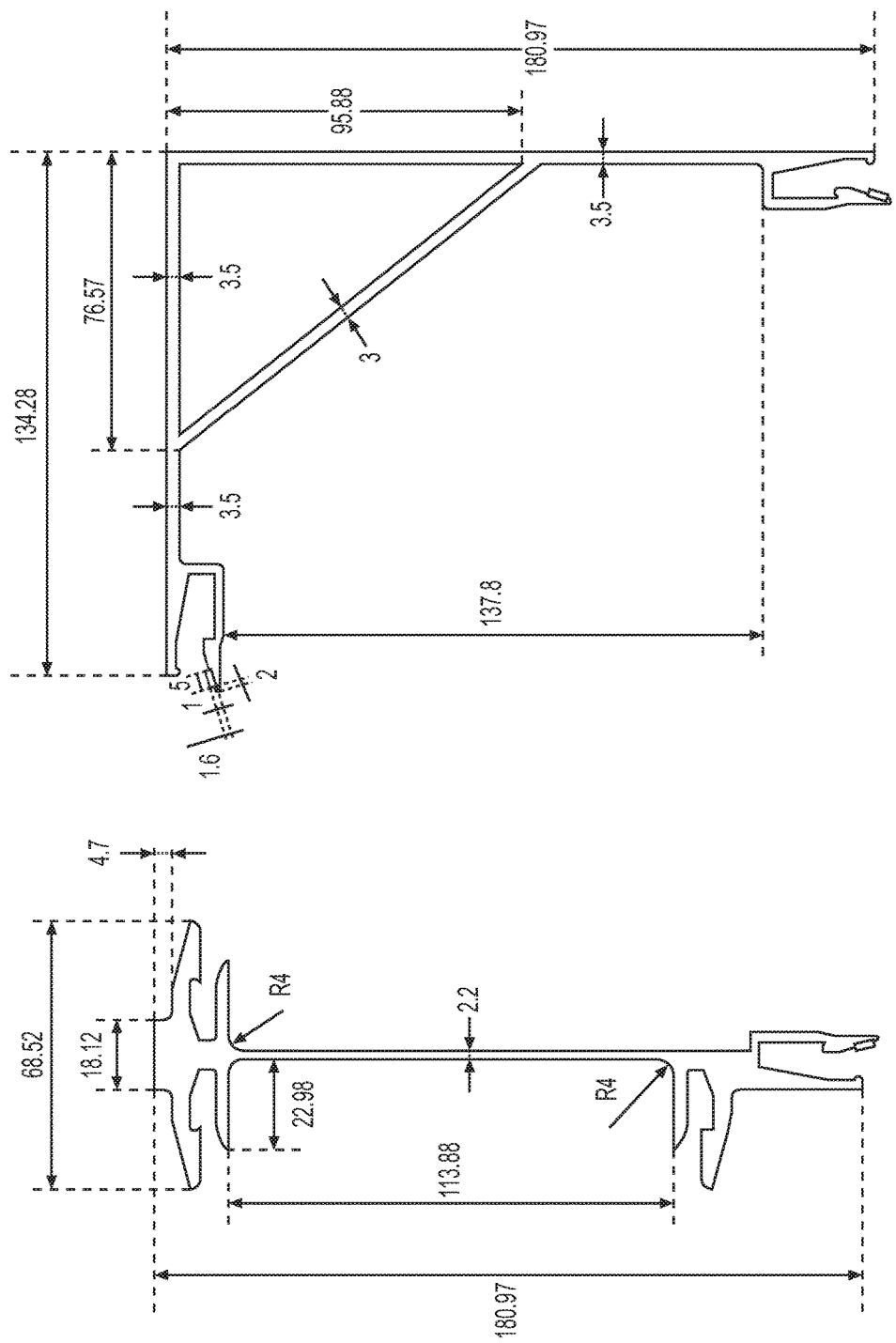
FIG. 17 illustrates the one embodied dimension of the corner form assembly in accordance with an aspect of the invention.

The building form system 10 further includes several extension forms 26 of various lengths for creating formed building walls of various dimensions that would not be possible with just the base forms 20 and the corner form assembly 21. As illustrated in FIG. 4, a first extension form 26' is provided and includes a pair of extension lateral walls 50 extending between a male and female connector 30, 32. Both male connectors 30 are aligned on one end of the first extension form 26' and both female connectors 32 are aligned on the other end. The extension lateral walls 50 are spaced apart and held in a parallel relationship by an offset extension wall 52. The offset extension wall 52 is disposed adjacent to of the pair of male connectors 30 and spaced from the pair of female connectors 32. When assembled with other forms, the extension lateral walls 50 of the first extension form 26' outline what will be an exterior surface of a finished wall. In the embodied dimension shown in FIG. 15, the extension lateral walls 50 extend approximately 2.5 inches (or 63.5 mm). Accordingly, when a formed building wall needs to be extended by 2.5 inches or more, the extension form 26' will be oriented so that the male connectors 30 adjacent to the offset extension wall 52 can mate with the female connectors 32 of the base form 20 maintaining a desired spacing between adjacent walls 38, 52. Alternatively, when the female connectors 32 spaced from the offset extension wall 52 of the first extension form 26' are connected to the male connectors 30 of the base form 20 adjacent to the peripheral wall 36, the desired spacing is still maintained for accommodating a certain amount of debris and/or rebar.

Figure 5:
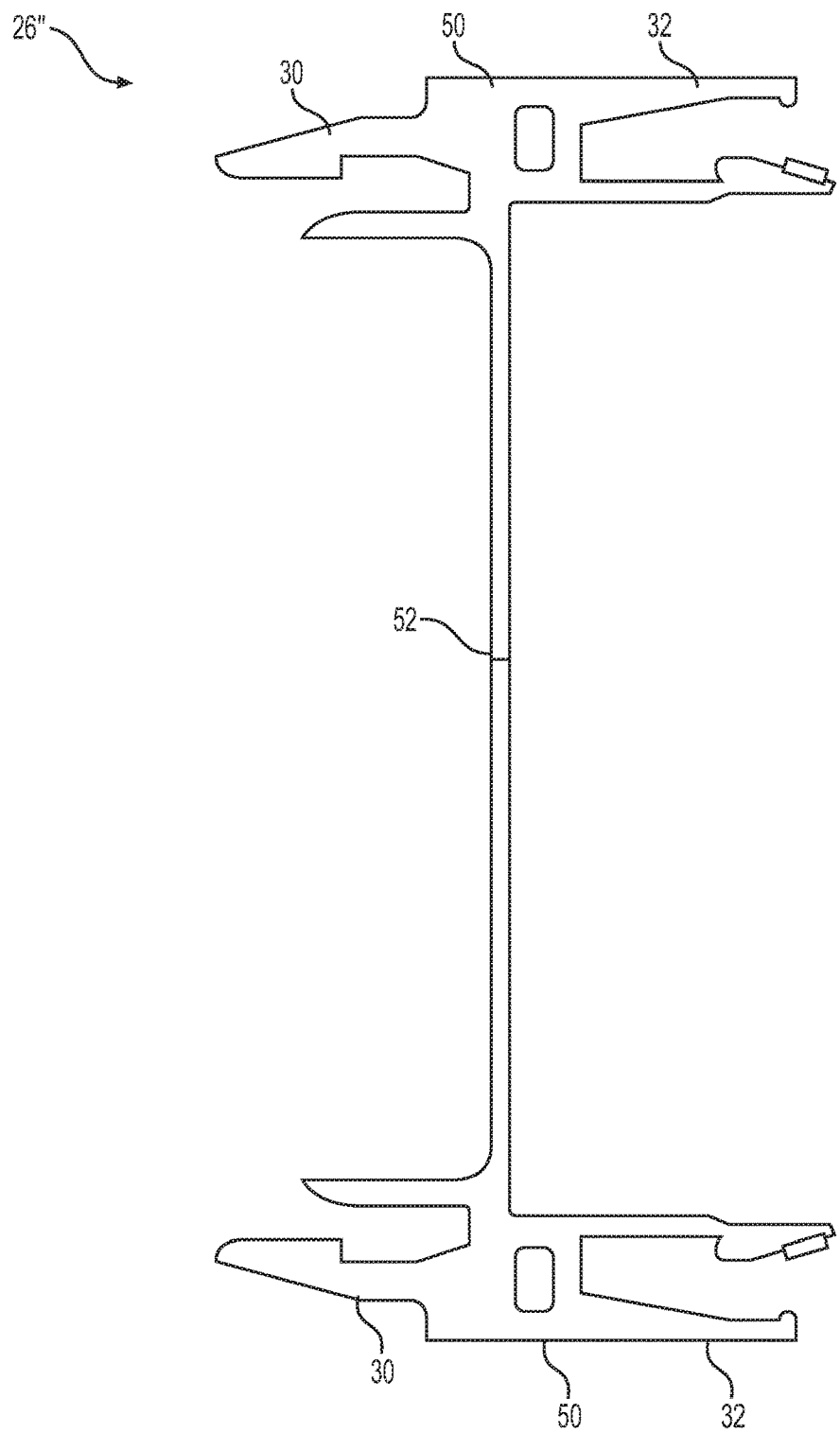
FIG. 5 is a top view of a second extension form shorter than the first extension form in FIG. 4.
Figure 14:
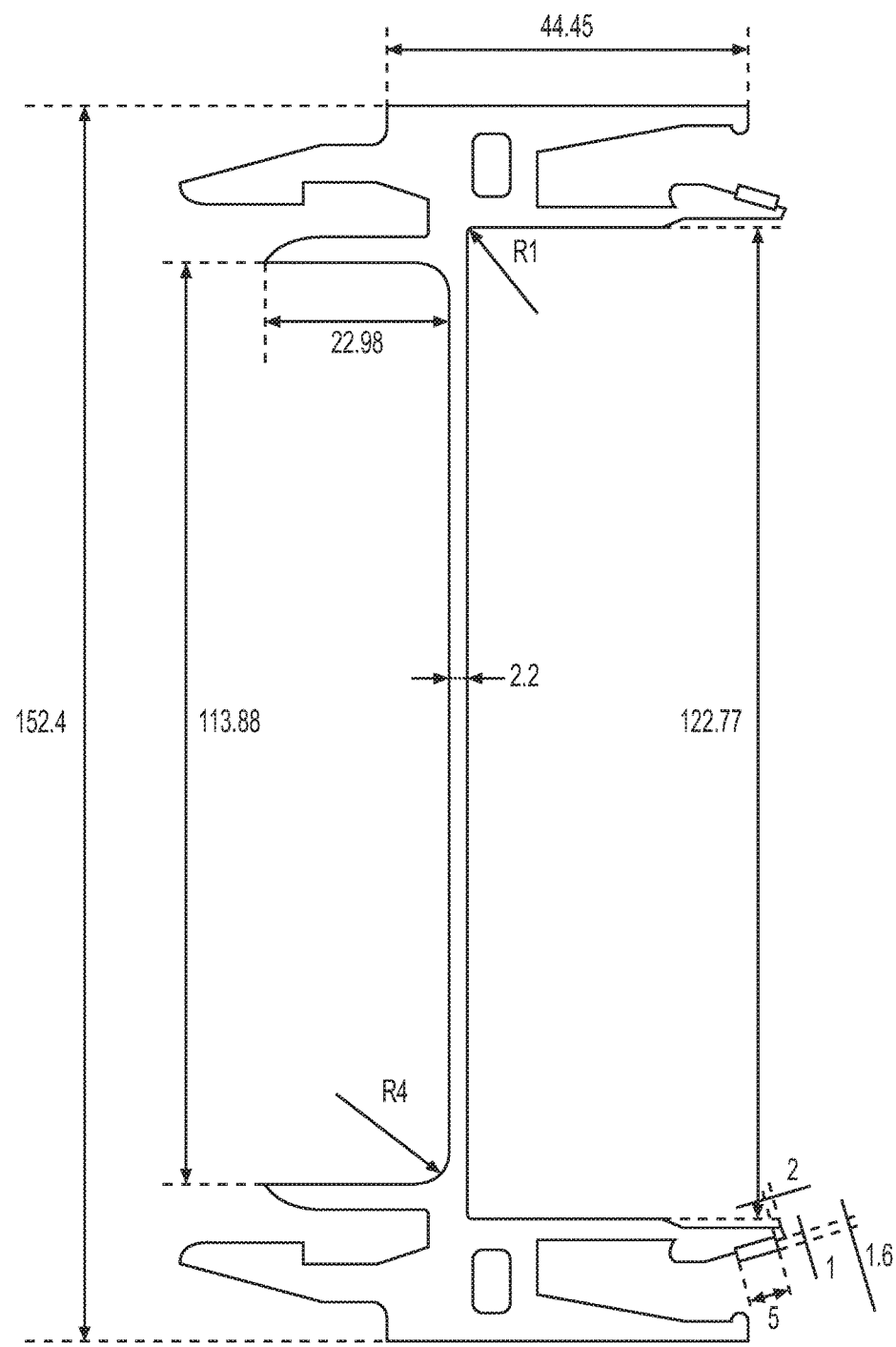
FIG. 14 illustrates one embodied dimension of the first extension form in accordance with an aspect of the invention.

A second extension form 26", is shown in FIG. 5 and includes lateral walls that extend less than 2.5 inches, preferably 1.75 inches (as shown in FIG. 14). If a longer extension is needed, the first and second extension forms 26', 26" can used together to extend 4.25 inches. It should also be appreciated that other lengths of the extension form 26 could be utilized as required or necessitated by building code without departing from the scope of the subject disclosure.

Figure 6:
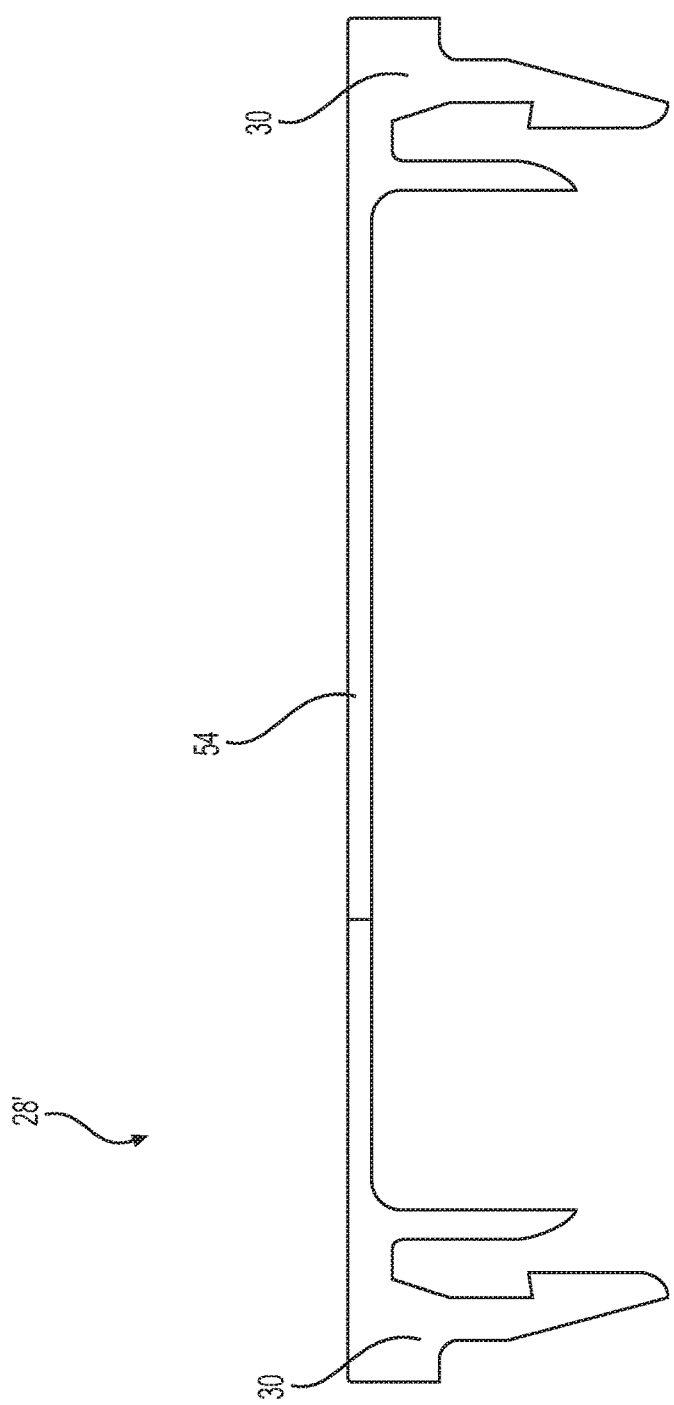
FIG. 6 is a top view of a first cap form including a pair of male connectors.
Figure 7:
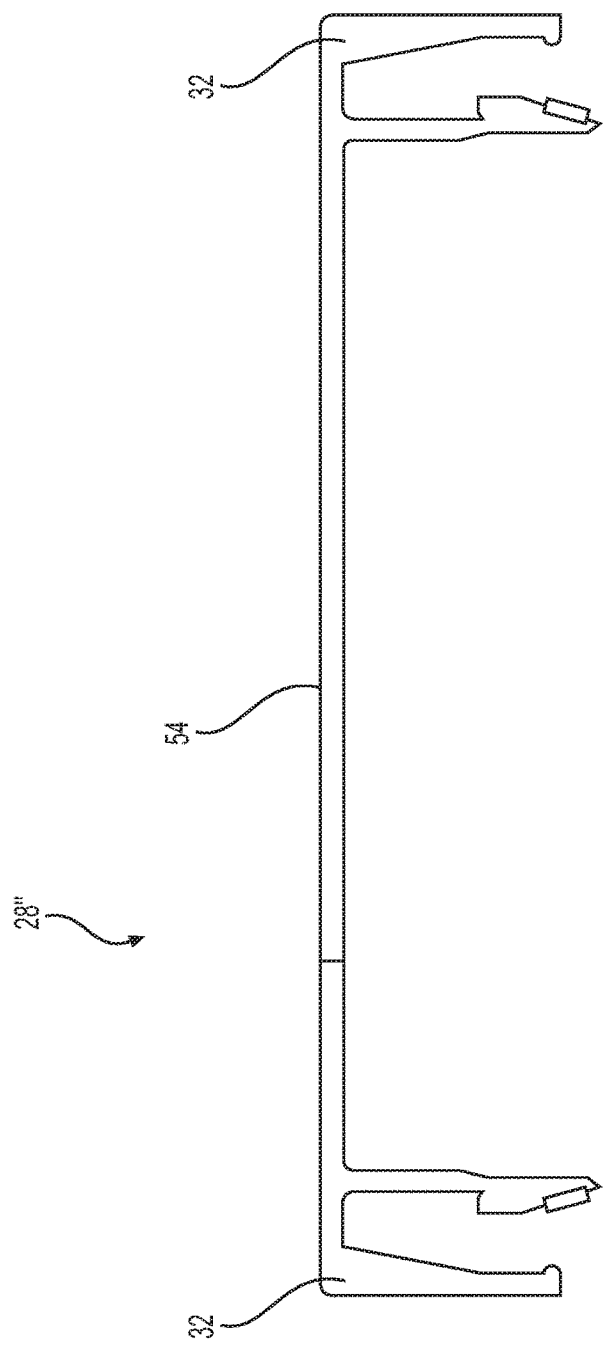
FIG. 7 is a top view of second cap form including a pair of female connectors.
Figure 8:
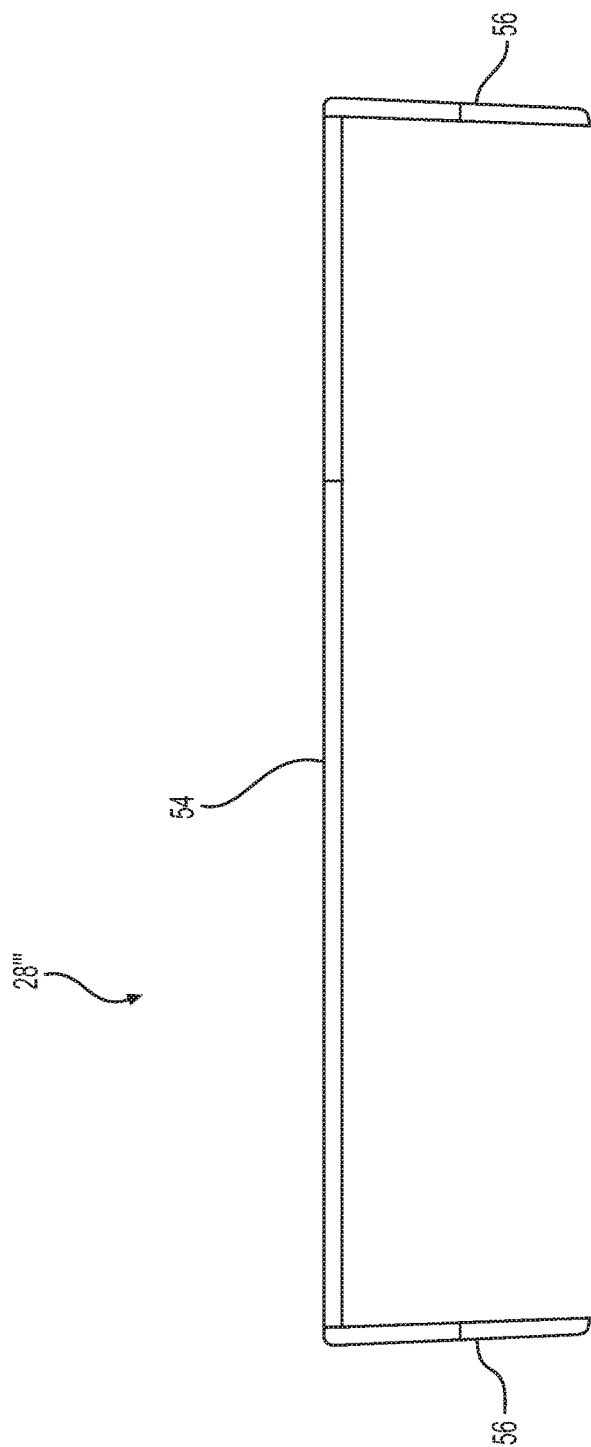
FIG. 8 is a top view of a third cap form without any connectors.
Figure 10:
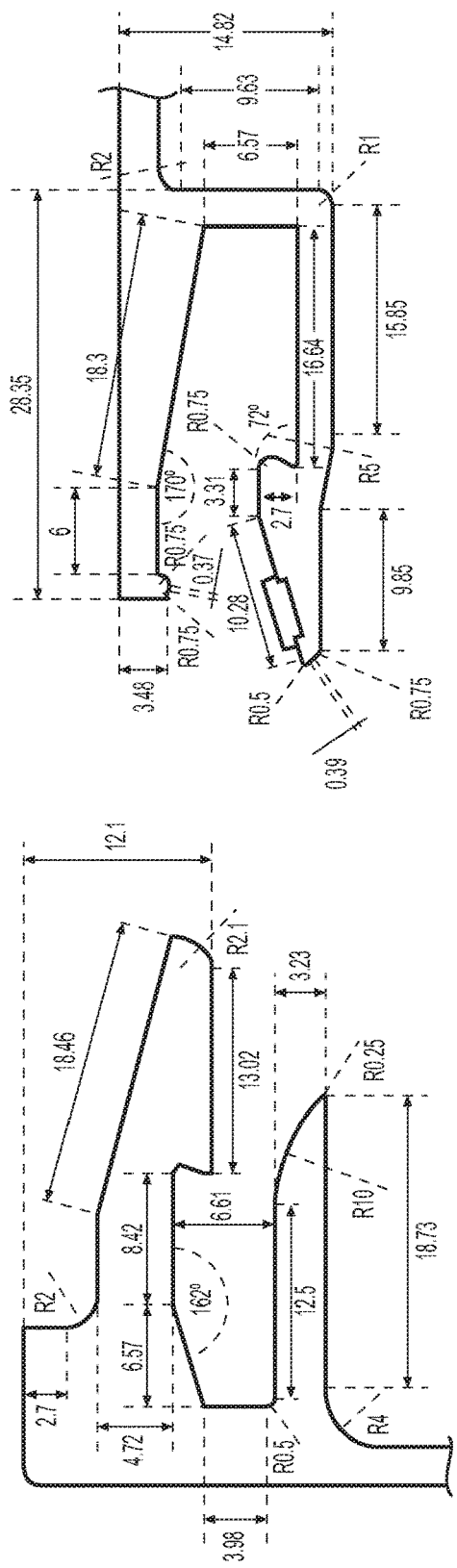
FIG. 10 illustrates one embodied dimension of the male connector and the female connector in accordance with an aspect of the invention.

The forms 20, 22, 24, 26, 28 also include cap forms 28 for capping ends of formed building walls so that they terminate squarely for both aesthetics (in interior walls that terminate into a room) and for squarely abutting one formed building wall into another formed building walls and forming a T-shaped intersection as seen from above. A first cap form 28' is generally shown in FIG. 6 and includes a cap wall 54 extending between male connectors 30 that face the same direction for accepting a pair of female connectors 32. A second cap form 28" is generally shown in FIG. 7 and also includes a cap wall 54 but extends between female connectors 32 that face the same direction for accepting a pair of male connectors 30. As such, a wall can be capped-off from either side of a base form 20, extension form 26, or assembled corner form assembly 21. Looking now to FIG. 8, a third cap form 28'" is shown to include a cap wall 54 extending between parallel lateral cap walls 56. During assembly of a building wall, the third cap form 28'" can be utilized for fitting around window openings, on top of half walls, or more generally wherever rectilinear edges are desired.

As previously mentioned, and as best illustrated in FIGS. 9A and 9B, the forms 20, 22, 24, 26, 28, with the exception of the third cap form 28'", include at least one male or female connector 30, 32. The male connectors 30 are generally U-shaped and comprise a male snap 58 and a male flange 60 that extend in a parallel relationship and are spaced apart by a male bridge 62 that in combination define a male entry 63 for accepting the female connector 32. The male snap 58 includes an outward male snap side 64 and an inward male snap side 66 that define a male snap base section 68, which extends inwardly from a step to a male snap straight section 70. The male snap straight section 70 then extends to a male snap hook section 72. The male snap hook section 72 has a wedge shape that narrows to a male point 74 and defines a male catch 76 extending at an acute angle from the inward male snap side 66. The male flange 60 defines a male flange straight section 78 that extends to a ramp section 80 that angles away from the male catch 76.

Still referring to FIGS. 9A and 9B, the female connectors 32 are also generally U-shaped and comprise a female snap 82 and a female flange 84 that extend in a parallel relationship to one another and are spaced apart by a female bridge 86 that in combination define a female entry 87 for accepting the male connector 30. The female snap 82 includes a female snap straight section 88 that extends to a female snap hook section 90. The female snap hook section 90 has a wedge shape that narrows to a female point 92 and defines a female catch 94 extending at an acute angle in the opposite direction of the male catch 76. Accordingly, when the male connector 30 and the female connector 32 are engaged, the female catch 94 mates and locks into the male catch 76 as the female snap 82 is pushed into the male entry 63 and the male snap 58 is pushed into the female entry 87 both being surrounded by the flanges 60, 84. In addition, the female catch 94 includes a seal 96 of elastomeric material or the like to facilitate a water tight connection between connectors 30, 32 and adjoining forms 20, 22, 24, 26, 28. Additionally, the female flange 84 defines a female flange straight section 98 extending to a rib 100 that extends perpendicularly from the straight section 98 towards the female snap 82 and slides into the inset defined by the male snap straight section 70 during engagement with the male connector 30. Spacing between the female catch 94 and the female flange 84, are at least in part more narrow than the male hook section 72, such that the male catch 76 is biased towards the female catch 94 during connection. When engaged, the female flange 84 abuts the male snap base section 68 so a template wall with more than one form 20, 22, 24, 26, 28 is presented as a flush surface. FIG. 9B illustrates a male and female connector 30, 32 engaged.

While male connectors 30 and female connectors 32 may be described in certain configurations in relation to the forms 20, 22, 24, 26, 28 and each other, the male connectors 30 and female connectors 32 could easily be reversed or configured in any way that would allow the forms 20, 22, 24, 26, 28 to have corresponding male connectors 30 and female connectors 32 that mate during assembly. However, it is important that one of the walls extending between connectors 30, 32 is adjacent to the connectors 30, 32 and the other wall is offset inwardly between opposite connectors 30, 32 as to maintain the desired spacings to accommodate rebar and/or a certain amount of debris without warping or misalignment.

Each of the walls and webbings have a thickness, which may vary depending on a chosen height of the forms 20, 22, 24, 26, 28 that will ultimately be selected to form an exterior surface of a formed building wall. Embodied dimensions of the various thicknesses are illustrated in FIGS. 10 through 17 and presented in millimeters. A taller wall or form must be able to contain more concrete without warping. Certain forms 20, 22, 24, 26, 28 are prefabricated at shorter heights to assembly with taller forms 20, 22, 24, 26, 28 and define window openings. To accommodate horizontal rebar that connects each of the forms 20, 22, 24, 26, 28 making up a form wall template (with the exception of certain cap forms 28), the forms 20, 22, 24, 26, 28 define bores 47 extending therethrough for receiving a horizontal piece of rebar 49. In a preferred arrangement, the bores 47 are disposed every 6 inches vertically as measured from the footing when the forms 20, 22, 24, 26, 28 are placed thereon. The bores 47 are preferably rectangular with chamfered edges and have a preferred dimension of 4.75 inches in height by 3.17 inches in width with chamfered portions cutting into both the height and width edges at 0.39 inches. These bores 47 can be punched out and spaced every 1.25 inches and in one arrangement a bottom bore 47 can be spaced 9.625 inches from a bottom of the associated form 20, 22, 24, 26, 28 (or spaced 12 inches at center of the bore 47). The forms 20, 22, 24, 26, 28 also have a width, for defining the distance between an exterior surface and an interior surface of the formed building wall. In a preferred embodiment, the width is 6, 8 or 10 inches as required or necessitated by code. The connectors 30, 32 generally extend along the entire height of the forms 20, 22, 24, 26, 28 (as shown in FIG. 1) but it should be appreciated that they are not required to. The forms 20, 22, 24, 26, 28 can be made of PVC or any other material light enough to handle and strong enough to contain poured concrete.

The building form system 10 further includes a method of assembly. The method of assembly facilitates the speed and safety of constructing formed building walls that pass current building codes in the United States. In one specific implementation, current U.S. building codes require that sets of vertical rebar 51 be spaced from one another every 18 inches along the location of foundation walls starting at the corners of the foundation. The vertical rebar 51 extends approximately 30 inches upright from the footing and can make forms particularly difficult to install. Accordingly, the system includes a method for constructing a foundation wall on top of a footing. The method includes providing a corner form assembly 21 having an inner corner form 22 and an outer corner form 24. The outer corner form 22 is placed on the outside of a vertical corner rebar 43 on a corner footing 45. Next, the inner corner form 22 is placed on the inside of the vertical rebar and mated with the outer corner form 24, such that the vertical rebar is disposed between forms 22, 24 and two pairs of connectors 30, 32 are presented on perpendicular sides of the assembled corner assembly 21. Next, a base form 20 is provided which extends approximately 18 inches in length and includes connectors 30, 32 on either end that are engaged with one of the pair of connectors 30, 32 of the corner form assembly 21, between adjacent vertical rebar. Subsequently, one or more base forms 20 or extension forms 26, having a shorter length than the base form 20, may be provided until a desired wall template is complete.

Importantly, because one of the connectors 30, 32 includes an inset wall 38, the base form 20 can be slid between preset rebar wherein the rebar becomes nested between an inset wall 38 and a peripheral wall 36 of adjoining base forms 20. One or more cap forms 28 may be provided for joining perpendicular formed building walls in the interior of a building or around window and door openings. Depending on which side of the base form 20 a wall needs to terminate, the cap form 28 can be provided with male connectors 30 or female connectors 32. In addition, the provided extension forms 26 can have various lengths that can be used alone or in combination to create formed building walls having the precise length as required by building plans.

The forms 20, 22, 24, 26, 28 define cavities so that they can be filled with concrete or the like after assembly. It should be appreciated that lateral walls disposed adjacent the male connectors 30 and female connectors 32 do not expand with the outward pressure of the concrete and therefore the formed building wall retains its intended shape even when filled with concrete. In addition, the connectors 30, 32 are shaped to snap fit into one another so that adjoining forms 20, 22, 24, 26, 28 can be slid along the footing and mated by pressing against one another. As a final step, bores 47, which are spaced approximately 6 inches apart, are aligned upon assembly and fitted with horizontal rebar to hold the individual forms together.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A building wall system including a plurality of forms for filling with concrete and constructing a building wall comprising:

a corner form assembly including an inner corner form and an outer corner form for assembling from an unassembled condition to an assembled condition;

said outer corner form including a pair of outer walls angled to one another from a vertex to define a first angle extending between said outer walls;

each of said outer walls extending from said vertex to a respective outer form connector;

said outer corner form includes a corner web extending between said outer walls and disposed in spaced relationship with said outer form connectors;

said inner corner form including an inner wall extending from a first end to a second end and having a first pair of connectors disposed at said first end and a second pair of connectors disposed at said second end; and said first pair of connectors disposed on opposite sides of said inner wall and at least one of said first pair of connectors interconnected with one of said outer form connectors to establish said assembled condition for assembling said corner form assembly around a preset rebar in a corner footing.

2. The building wall system of claim 1, wherein said second pair of connectors are disposed in an angular relationship relative to each other to define a second angle.

3. The building wall system of claim 2, wherein said first angle and said second angle are equal.

4. The building wall system of claim 3, wherein said first angle and said second angle are 90°.

5. The building wall system of claim 4, wherein said corner web is disposed closer to said vertex than said second pair of connectors of said inner corner form when said corner assembly is in said assembled condition for placement of said corner web between the corner rebar and said vertex.

6. The building wall system of claim 1, wherein said outer form connectors are one of male connectors and female connectors and at least one connector of said first pair of connectors on said inner corner form are the other of male connectors and female connectors.

7. The building wall system of claim 6, wherein said male connectors include a male hook section having a male point and a male catch and wherein said female connectors include a female hook section having a female point and a female catch and pressing said male connector into said female connector flexes at least one of said male hook section and said female hook section until said male catch and said female catch are aligned and snap together into locked engagement.

8. The building wall system of claim 7, wherein said male connectors include a male flange that extends in a parallel relationship to said male hook section defining a male entry for accepting said female hook section.

9. The building wall system of claim 7, wherein said female hook section includes an elastomeric seal for preventing fluid from entering between connected ones of said male connectors and said female connectors.

10. The building wall system of claim 7, wherein said female connectors include a female flange that extends in a parallel relationship to said female hook section defining a female entry for accepting said male hook section.

11. The building wall system of claim 10, wherein said male connector includes a base section spaced outwardly from said male hook section by a step and forming part of the exterior building wall and wherein said female flange abuts said step during connection and remains flush with said base section.

12. The building wall system of claim 10, wherein at least a portion of said female entry defined by said female hook section and female flange defines a space less than a width of said male hook section such that one of said female flange and said female hook section must flex to accommodate said male hook section until said male catch and said female catch are aligned and snap together wherein said female flange and female hook section return to a non-flexed condition and retain said male catch against said female catch.

13. The building wall system of claim 6, wherein said plurality of forms includes a first base form extending between a first base pair of connectors being one of said male and female connectors having a peripheral wall disposed directly therebetween and a second base pair of connectors including the other of said male and female connectors and having an inset wall spaced inwardly therebetween.

14. The building wall system of claim 13, wherein said first base pair of connectors are configured to matingly engage with said base second pair of connectors of an adjacent second base form and wherein said peripheral wall of said first base form is spaced from said inset wall of a said second base form for allowing a certain amount of debris to enter therein without misalignment or bowing between said engaged base forms.

15. The building wall system of claim 14, wherein said space between adjacent ones of said inset walls and said peripheral walls of said engaged base forms is centered 16 to 20 inches from said opposite inset walls and peripheral walls for accommodation of vertical rebar spaced approximately every 18 inches.

16. A building wall system including a plurality of forms for filling with concrete and constructing a building wall comprising:

a corner form assembly for disposition on a corner footing including an inner corner form and an outer corner having an assembled condition wherein said inner corner form is connected to said outer corner form and an unassembled condition wherein said outer corner form and inner corner form are separated;

at least two base forms each extending between a first base pair of connectors having a peripheral wall disposed directly therebetween and a second base pair of connectors having an inset wall disposed inwardly therebetween;

said first base pair of connectors and second base pair of connectors including corresponding catches for snap-fit engagement therebetween;

wherein said peripheral wall and said inset wall of adjacently attached base forms are spaced from one another;

said outer corner form including a pair of outer walls angled to one another from a vertex and each extending from said vertex relative to one another at a first angle to a respective outer form connector and said inner corner form including an inner wall extending from a first end to a second end and having a first pair of connectors disposed at said first end and a second pair of connectors disposed at said second end;

said outer corner form includes a corner web extending between said outer walls and disposed in spaced relationship with said outer form connectors; and one of said first pair of connectors interconnected with one of said outer form connectors to establish said assembled condition of said corner form assembly.

17. The building wall system of claim 16, wherein said inset wall and said peripheral wall have a height substantially equal to a building wall including a plurality of bores for accommodating interweaved vertical rebar for further connecting said base forms.

18. The building wall system of claim 16, including an extension form for attachment to one of said first pair of connectors and said second pair of connectors and extending a different length than said base form for constructing building walls of various lengths.

19. The building wall system of claim 16, wherein said second pair of connectors are disposed in an angular relationship to define a second angle being equal to the first angle.

\* \* \* \* \*